April 16, 1946. H. E. S. McLELLAN 2,398,587
WIRE WOUND ELECTRICAL RESISTOR
Filed July 25, 1944
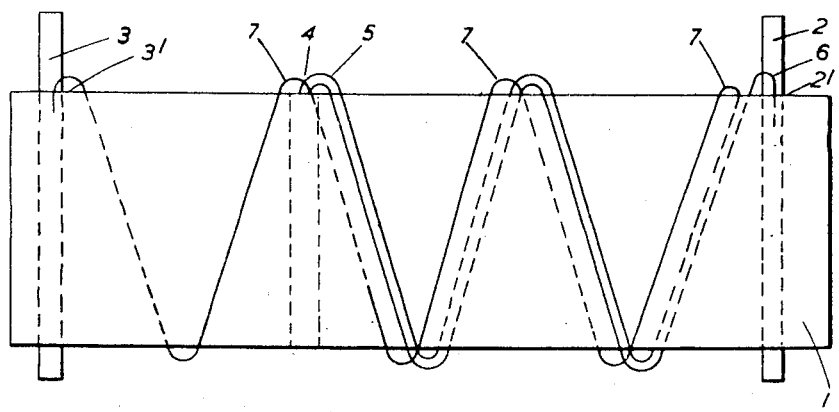
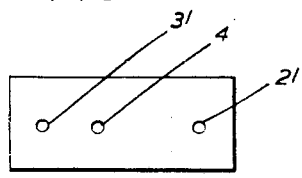
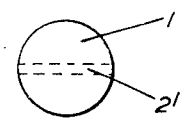
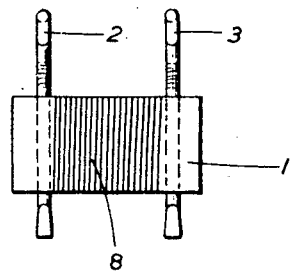
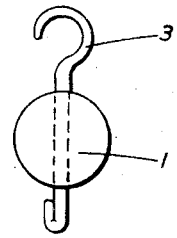
Inventor
Harry Ernest Sidney McLellan
By
Attorney Patented Apr. 16, 1946

2,398,587

UNITED STATES PATENT OFFICE 2,398,587

WIRE WOUND ELECTRICAL RESISTOR

Harry Ernest Sidney McLellan, London, England, assignor to Standard Telephones and Cables Limited, London, England, a British company Application July 25, 1944, Serial No. 546,444
In Great Britain July 14, 1943

2 Claims. (Cl. 201—63)

This invention relates to wire wound resistances which have a small phase angle. Such resistances are frequently required in high frequency communication systems.

Known methods of winding a resistance non-inductively include (a) bifilar windings (b) reversed layer windings and (c) a combination of (a) and (b). In the case of the bifilar winding, two wires are laid on the spool side by side and their inner ends are joined to form a resistance unit. Thus one half of the winding is laid on in electrical opposition to the other half, and, if the two parallel wires are accurately laid side by side, the inductance of the winding is nil. With the reversed layer method the wire is wound on singly and the direction of the winding relative to the former is reversed at the end of each layer, so that the inductance of the odd layers is annulled by that of the even layers provided that the number of turns is exactly equal. In both of the above cases, however, the winding presents a capacitative reactance, unless, in the case of the reversed layer winding, an odd number of layers is put on, when the last layer is inductive and serves to annul part, if not all, of the capacitative component of the other pairs of layers.

There are objections to manufacturing windings of the reversed layer type, in that the winding wire has to be tied to the former at the end of each layer; the former has then to be removed from the winding machine and reversed end for end in the chuck. It is known to use a flat card as the former and to provide two nicks in close proximity on the edge of the card so that the wire can be hooked on the projection between the nicks at the end of each layer, so saving the tying. There still remains, however, the necessity to reverse the card.

It is the object of the present invention to provide a resistance of the wire wound type which has a phase angle of substantially zero and at the same time can be conveniently wound.

In order to attain this object I provide, according to one feature of the invention, a resistance of the wire wound type which consists partly of bifilar turns and partly of inductive turns, the inductance of the latter being arranged to substantially annul the capacitance of the bifilar turns.

Such a resistance may be made by winding on a former a predetermined number of bifilar turns of resistance wire, terminating one of the wires on an external terminal and then continuing the winding with the other single wire in the same direction, that is, without reversing the former or the winding machine, so that the capacitance of the bifilar turns is substantially annulled by the inductance of the single-wire turns at the particular frequency at which the resistance is intended to be used. The free end of this inductive portion of the winding is then terminated on the other terminal.

In order that the invention may be more clearly understood, a description of one embodiment follows with reference to the accompanying drawing in which:

Fig. 1 is a diagrammatic representation of a resistance according to the invention, to show the manner in which it is wound; and Figs. 2–5 shows a particular form of resistance wound as shown in Fig. 1.

Referring to Fig. 1, I represents a cylindrical former in which three holes $2^1$, $3^1$, 4, are drilled. Terminals 2 and 3 are inserted in holes $2^1$ and $3^1$ while the third hole 4 is used to anchor the loop of the bifilar wire 5 which is then wound towards the terminal 2. The other wire 7 is then wound over the bifilar turns without reversing the winding machine. As shown, the second wire 7 is then terminated on the terminal 3. The windings are then covered with the composition used to proof such a unit against moisture.

The particular example which will be described (Figs. 2–5) is a resistance of 600 ohms which is required for test purposes on high frequency communication systems. As shown in the figures like reference numerals are used to indicate like parts of the unit. In Fig. 4, which is a side view, I is the former, 2 and 3 are terminals and 8 represents the actual winding. Fig. 5 is an end view showing the shape of the terminal 3, while Figs. 2 and 3 show the former used in the example described below.

For the purpose for which it is intended the value of the resistance is specified as constant to within ±1% of the direct current resistance and possessing a phase angle of not more than 1° at 150 kilocycles. This means that its reactance must be not more than 10.5 ohms, or at the frequency specified ±$\mu$H. For the particular purpose for which the resistance unit is intended it is necessary that it should be small, and so the former is restricted in size to ¼" in diameter by ⅝" long.

In order to reduce the capacitance of the 600 ohms winding it is desirable to keep the number of turns as low as possible and therefore Nichrome wire is used. With 46 Standard Wire Gauge (S. W. G.) Nichrome wire the resistance of different specimens was found to vary from 299 ohms per yard to 366 ohms per yard so that experiments had to be made with maximum and minimum resistance wire in order to determine the initial number of bifilar turns which would enable the limits of total resistance to be obtained from each value. The table given below shows the progressive stages of the various experiments in which 46 S. W. G. single silk-covered Nichrome wire was used throughout. In the case of the bifilar windings a turn is taken to mean one turn of two wires laid side by side.

| Winding particulars | Inductance± at 150 kc./s. |
|---|---|
| | $\mu H$ |
| (1) Single inductive layer of 85 turns | +15 |
| (2) Single bifilar layer of 42 turns | −9 |
| (3) 28 bifilar turns+18 inductive turns of 366 ohms per yard wire | −2.5 |
| (4) 28 bifilar turns+32 inductive turns of 299 ohms per yard wire | +2.0 |

All these windings were made to within ±1% of 600 ohms, the required direct current resistance value, and the table shows the two extreme limits of inductance and capacitance (i. e. negative inductance) in the cases of numbers 1 and 2, while cases 3 and 4 show how nearly the inductance or capacitance can be neutralised by a varying number of inductive turns depending upon the resistance per yard of the wire used. It is fair to assume that if wire measuring 332.5 ohms per yard had been used and 25 inductive turns added, the inductance would have been zero.

Obviously the principle of this invention may be used in the winding of any coil where an electrical angle approaching zero is required, the only limitation on obtaining a phase angle of exactly zero being the commercial variation of resistance of the wire itself and in a secondary way, the accuracy with which the former can be made to the specified diameter. In the present case the latter does not enter into consideration since the diameter is so small.

The invention is, of course, applicable to resistances of the multilayer type in which case the number of inductive turns should be increased to off-set the capacitance between the layers of the said winding. It is of course, also applicable to resistances in which a single layer coil is used and the inductive winding is placed alongside the bifilar turns. Another factor which affects the number of turns used is the specific inductive capacity of the compound used for impregnating the resistance. In the example quoted it necessitates a reduction of the number of bifilar turns to 25 and a corresponding increase in the number of inductive turns when the resistance wire is covered with a moisture proofing compound to meet tropical conditions.

What is claimed is:

1. A resistor of the wire wound type adapted for winding by uni-directional rotation of its former comprising a former provided with opposite end terminal connections and with an intermediately positioned anchoring means and a continuous wire formed with a return bend and short and long length portions and having the return bend secured by the anchoring means and wound with bifilar turns outwardly progressing and terminating with the short length portion with its end in position for connection with one terminal and with a continuous single turn winding of the longer length portion progressing in the opposite direction and terminating with its end in position for connection with the opposite terminal.

2. A resistor of the wire wound type adapted for winding by uni-directional rotation of its former comprising a cylindrical former provided with opposite end terminal connections and with an intermediately positioned anchoring opening and a continuous wire formed with a return bend and short and long length portions having the return bend positioned within the anchoring opening and wound with bifilar turns outwardly progressing and terminating with the short length portion with its end in position for connection with one terminal and with a continuous single turn winding of the longer length progressing in the opposite direction and terminating in position for connection with the opposite terminal, the respective numbers of turns in each winding being so chosen that the phase angle in the combined winding is substantially zero at a predetermined frequency.

HARRY ERNEST SIDNEY McLELLAN.